United States Patent
Jiang et al.

(10) Patent No.: US 12,401,719 B2
(45) Date of Patent: Aug. 26, 2025

(54) LIVE WORKLOAD MIGRATION FOR HARDWARE OFFLOAD CAPABLE NICs USING RDMA

(71) Applicant: VMware LLC, Palo Alto, CA (US)

(72) Inventors: Wenyi Jiang, Fremont, CA (US); Jingchun Jason Jiang, Beijing (CN); Ankur Kumar Sharma, Mountain View, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/236,311

(22) Filed: Aug. 21, 2023

(65) Prior Publication Data

US 2025/0023946 A1    Jan. 16, 2025

(30) Foreign Application Priority Data

Jul. 14, 2023  (WO) ................ PCT/CN2023/107366

(51) Int. Cl.
*H04L 67/1097* (2022.01)
*G06F 9/455* (2018.01)

(52) U.S. Cl.
CPC ...... *H04L 67/1097* (2013.01); *G06F 9/45558* (2013.01); *G06F 2009/4557* (2013.01)

(58) Field of Classification Search
CPC ............. H04L 67/1097; G06F 9/45558; G06F 2009/4557

(Continued)

(56) References Cited

U.S. PATENT DOCUMENTS

| 9,548,965 B2 | 1/2017 | Wang et al. |
| 2015/0055468 A1* | 2/2015 | Agarwal ............. H04L 47/2483 370/232 |

(Continued)

FOREIGN PATENT DOCUMENTS

WO    WO-2023011254 A1 *   2/2023   ......... G06F 9/45558

OTHER PUBLICATIONS

Mahalingam, M. et al., Vxlan: A Framework for Overlaying Virtualized Layer 2 Networks Over Layer 3 Networks, Internet Engineering Task Force (IETF), May 8, 2013, 21 pages.

*Primary Examiner* — Suraj M Joshi
*Assistant Examiner* — Ayele F Woldemariam
(74) *Attorney, Agent, or Firm* — Quarles & Brady LLP

(57) ABSTRACT

Some embodiments of the invention provide a method of migrating a virtual machine (VM) from a first host computer to a second host computer, the first host computer having a first PNIC, the second host computer having a second PNIC, the first and second PNICs for performing at least one of network forwarding operations and middlebox service operations for the VM. At an RDMA client executing on a set of one or more processors of the second PNIC, the method receives a notification from the second host computer indicating a data migration that is performed to migrate the particular VM from the first host computer to the second host computer has started. Based on the notification, at the RDMA client, the method directs an RDMA server executing on the first PNIC to provide networking state data associated with at least one of network forwarding operations and middlebox service operations that the first PNIC performs for the VM. The provided networking state data resides in a memory of the first PNIC that is accessible to the RDMA server.

17 Claims, 10 Drawing Sheets

(58) Field of Classification Search
USPC .......................................................... 709/217
See application file for complete search history.

(56) References Cited

U.S. PATENT DOCUMENTS

| | | |
|---|---|---|
| 2015/0095446 A1* | 4/2015 | Ramasubramanian ...................... H04L 67/1008 709/214 |
| 2015/0309839 A1* | 10/2015 | Lu ........................ G06F 9/5077 718/1 |
| 2016/0267051 A1* | 9/2016 | Metzler ............. G06F 15/17331 |
| 2019/0286574 A1* | 9/2019 | Chen ................... H04L 67/1097 |
| 2020/0034191 A1* | 1/2020 | Tarasuk-Levin .... G06F 9/45558 |
| 2021/0194828 A1* | 6/2021 | He .......................... H04L 47/33 |
| 2022/0092021 A1* | 3/2022 | Cherian .................. H04L 41/12 |
| 2023/0006981 A1* | 1/2023 | Syrivelis ............... H04L 9/0852 |

* cited by examiner

LIVE WORKLOAD MIGRATION FOR HARDWARE OFFLOAD CAPABLE NICs USING RDMA

BACKGROUND

Smart NICs are physical NICs that have embedded arm cores that allow virtualization software (e.g., hypervisors) to offload networking and storage functionality to the smart NICs while saving on the CPU cost on the virtualization software side. However, during some machine migrations, the state from a smart NIC associated with the migrating machine is copied from the device to the smart NIC memory, and then transferred to the host computer's memory, and similarly on the destination host computer, the state is copied from the destination host computer's memory to the smart NIC memory, all on kernel threads of the host computers. Such an approach is limited due to the limited memory of the smart NIC and the potentially large size of the data being transferred, resulting in potential failures during the saving and restoring of the data, especially as data is scaled up.

BRIEF SUMMARY

Some embodiments of the invention provide a method for migrating a virtual machine (VM) from a first host computer that includes a first physical network interface card (PNIC) that performs at least one operation for the VM, such as a network forwarding or middlebox service operation, to a second host computer. The first host computer establishes an event channel with the first PNIC for use in obtaining networking state data associated with the at least one operation that the first PNIC performs for the VM. The first host computer then uses the event channel to perform an RDMA (Remote Direct Memory Access) operation to obtain the networking state data from the first PNIC, and provides the obtained networking state data to the second host computer as part of a data migration that is performed to migrate the VM from the first host computer to the second host computer.

In some embodiments, an RDMA client is configured on the first host computer and an RDMA server is configured on the first PNIC for performing the RDMA operation to transfer the networking state data from the first PNIC to the first host computer. The configuration of the RDMA server includes a configuration to enable the RDMA server to access the networking state data of the PNIC, according to some embodiments. In some embodiments, the RDMA client on the first host computer initiates a connection with the RDMA server on the first PNIC in order to establish the event channel and request, from the RDMA server, the networking state data. In response to the request, the RDMA server transfers the networking state data to the RDMA client on the first host computer via the event channel.

After the networking state data has been transferred from the first PNIC to the first host computer, the event channel between the RDMA client and RDMA server is terminated, in some embodiments. The RDMA client on the first host computer, in some embodiments, adds the received networking state data to a storage structure that can be accessed by a VM migration module that is configured on the first host computer to perform the data migration. In some embodiments, the storage structure is also used to store VM data. The VM data, in some embodiments, includes configuration state data associated with a configuration of the VM.

The VM migration module configured on the first host computer is a first VM migration module, in some embodiments, and a second VM migration module is configured on the second host computer. In some embodiments, the first VM migration module retrieves the networking state data and the VM configuration state data from the storage structure on the first host computer to send to the second VM migration module on the second host computer. After all of the data has been migrated to the second host computer, the PNIC of some embodiments deletes the networking state data stored on the PNIC. In other embodiments, the PNIC deletes the networking state data after the networking state data has been transferred to the first host computer.

At the second host computer, the VM state configuration data is used to configure the migrated VM and the networking state data is used to configure the second PNIC of the second host computer to perform the at least one of network forwarding operations and middlebox service operations. Examples of network forwarding operations of some embodiments include layer 2 (L2) forwarding operations and layer 3 (L3) forwarding operations. Example of middlebox service operations of some embodiments include distributed firewall operations, load balancing operations, and network address translation (NAT) operations.

In some embodiments, an RDMA server is configured on the second host computer and an RDMA client is configured on the second PNIC to perform an RDMA operation to transfer the networking state data received at the second host computer as part of the data migration to the second PNIC. In some such embodiments, the RDMA client on the second PNIC initiates a connection with the RDMA server on the second host computer to establish an event channel. The RDMA client on the second PNIC then uses the event channel to request the networking state data, and the RDMA server on the second host computer performs the RDMA operation to provide the networking state data to the RDMA client on the second PNIC via the event channel. In other embodiments, the networking state data is written directly to a memory of the second PNIC.

As an alternative to performing the RDMA operation between the first PNIC and the first host computer, some embodiments of the invention perform the RDMA operation between the first and second PNICs as part of the data migration for migrating the VM from the first host computer to the second host computer. For example, in some embodiments, once the data migration has started between the first and second VM migration modules on the first and second host computers, the second PNIC receives from the second host computer a notification that the data migration has started. Based on the notification, the second PNIC establishes an event channel with the first PNIC of the first host computer, and uses the event channel to perform an RDMA operation to obtain the networking state data associated with the at least one of network forwarding operations and middlebox service operations that the first PNIC performs for the VM.

In some embodiments, the event channel is established by an RDMA client that is configured on the second PNIC and an RDMA server that is configured on the first PNIC. The RDMA client on the second PNIC of some embodiments establishes a connection with the RDMA server on the first PNIC in order to establish the event channel, and then uses the event channel to request the networking state data from the RDMA server. The RDMA server on the first PNIC, having been configured with access to the networking state data, performs the RDMA operation to transfer the networking state data to the RDMA client on the second PNIC in response to the request, according to some embodiments, via the event channel. After the networking state data has been transferred, the event channel between the RDMA server on the first PNIC and RDMA client on the second PNIC is terminated.

As the RDMA operation is performed between the first and second PNICs, the first VM migration module configured on the first host computer migrates the VM configuration state data to the second VM migration module configured on the second host computer. The data migration between the first and second VM migration modules and the RDMA operation between the first and second PNICs are performed asynchronously, according to some embodiments. The VM configuration state data is then used to configure the migrated VM on the second host computer.

In some embodiments, the first PNIC is associated with a set of physical ports that connect the first PNIC to a physical network, and each port in the set is associated with a particular identifier and a particular IP (Internet protocol) address that is assigned to the first PNIC. Before the second PNIC receives the notification from the second host computer that the data migration has started, a compatibility test is performed to ensure that the particular identifiers and particular IP addresses are available at the second host computer for the second PNIC. In some embodiments, when the identifiers and IP addresses are not available, another host computer is identified for the migration of the VM.

Additionally, the first and second PNICs of some embodiments each include a virtual switch. In some embodiments, the set of identifiers associated with the physical ports are also associated with a VNIC (virtual network interface card) of the VM. The set of identifiers, in some embodiments, are added to the virtual switch of the second PNIC, and the virtual switch assigns the set of identifiers to a set of interfaces of the virtual switch and associates the set of interfaces with the VNIC of the VM and uses the interfaces to forward data messages to and from the VNIC, according to some embodiments.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
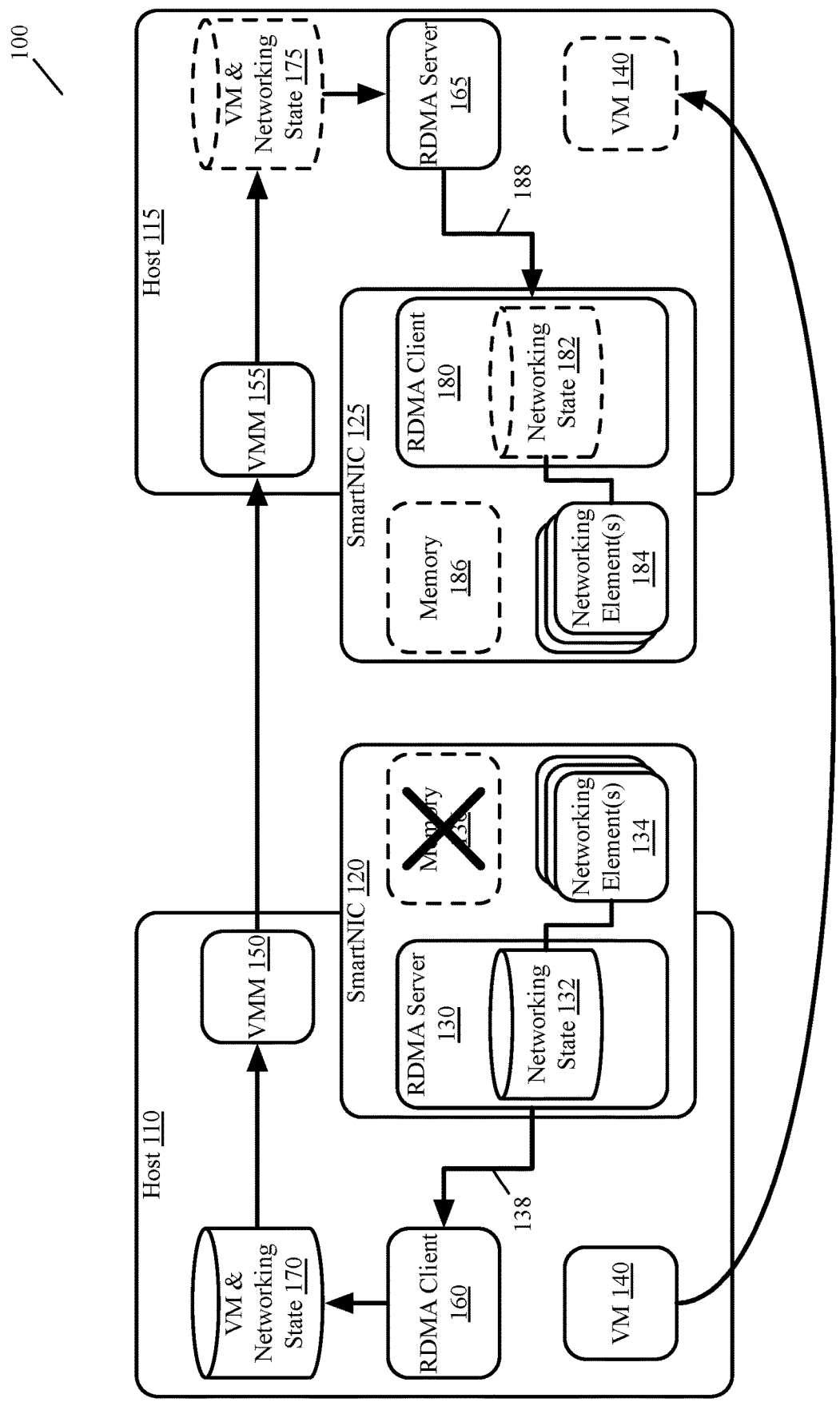
FIG. 1 conceptually illustrates a diagram of a VM migration of some embodiments in which data from a smart NIC is transferred to a host computer using RDMA.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for migrating a virtual machine (VM) from a first host computer that includes a first physical network interface card (PNIC) that performs at least one operation for the VM, such as a network forwarding or middlebox service operation, to a second host computer. The first host computer establishes an event channel with the first PNIC for use in obtaining networking state data associated with the at least one operation that the first PNIC performs for the VM. The first host computer then uses the event channel to perform an RDMA (Remote Direct Memory Access) operation to obtain the networking state data from the first PNIC, and provides the obtained networking state data to the second host computer as part of a data migration that is performed to migrate the VM from the first host computer to the second host computer.

In some embodiments, an RDMA client is configured on the first host computer and an RDMA server is configured on the first PNIC for performing the RDMA operation to transfer the networking state data from the first PNIC to the first host computer. The configuration of the RDMA server includes a configuration to enable the RDMA server to access the networking state data of the PNIC, according to some embodiments. In some embodiments, the RDMA client on the first host computer initiates a connection with the RDMA server on the first PNIC in order to establish the event channel and request, from the RDMA server, the networking state data. In response to the request, the RDMA server transfers the networking state data to the RDMA client on the first host computer via the event channel.

After the networking state data has been transferred from the first PNIC to the first host computer, the event channel between the RDMA client and RDMA server is terminated, in some embodiments. The RDMA client on the first host computer, in some embodiments, adds the received networking state data to a storage structure that can be accessed by a VM migration module that is configured on the first host computer to perform the data migration. In some embodiments, the storage structure is also used to store VM data. The VM data, in some embodiments, includes configuration state data associated with a configuration of the VM.

The VM migration module configured on the first host computer is a first VM migration module, in some embodiments, and a second VM migration module is configured on the second host computer. In some embodiments, the first VM migration module retrieves the networking state data and the VM configuration state data from the storage structure on the first host computer to send to the second VM migration module on the second host computer. After all of the data has been migrated to the second host computer, the PNIC of some embodiments deletes the networking state data from the PNIC. In other embodiments, the PNIC deletes the networking state data after the networking state data has been transferred to the first host computer.

At the second host computer, the VM state configuration data is used to configure the migrated VM and the networking state data is used to configure the second PNIC of the second host computer to perform the at least one of network forwarding operations and middlebox service operations. Examples of network forwarding operations of some embodiments include layer 2 (L2) forwarding operations and layer 3 (L3) forwarding operations. Example of middlebox service operations of some embodiments include distributed firewall operations, load balancing operations, and network address translation (NAT) operations.

In some embodiments, an RDMA server is configured on the second host computer and an RDMA client is configured on the second PNIC to perform an RDMA operation to transfer the networking state data received at the second host computer as part of the data migration to the second PNIC. In some such embodiments, the RDMA client on the second PNIC initiates a connection with the RDMA server on the second host computer to establish an event channel. The RDMA client on the second PNIC then uses the event channel to request the networking state data, and the RDMA server on the second host computer performs the RDMA operation to provide the networking state data to the RDMA client on the second PNIC via the event channel. In other embodiments, the networking state data is written directly to a memory of the second PNIC.

As an alternative to performing the RDMA operation between the first PNIC and the first host computer, some embodiments of the invention perform the RDMA operation between the first and second PNICs as part of the data migration for migrating the VM from the first host computer to the second host computer. For example, in some embodiments, once the data migration has started between the first and second VM migration modules on the first and second host computers, the second PNIC receives from the second host computer a notification that the data migration has started. Based on the notification, the second PNIC establishes an event channel with the first PNIC of the first host computer, and uses the event channel to perform an RDMA operation to obtain the networking state data associated with the at least one of network forwarding operations and middlebox service operations that the first PNIC performs for the VM.

In some embodiments, the event channel is established by an RDMA client that is configured on the second PNIC and an RDMA server that is configured on the first PNIC. The RDMA client on the second PNIC of some embodiments establishes a connection with the RDMA server on the first PNIC in order to establish the event channel, and then uses the event channel to request the networking state data from the RDMA server. The RDMA server on the first PNIC, having been configured with access to the networking state data, performs the RDMA operation to transfer the networking state data to the RDMA client on the second PNIC in response to the request, according to some embodiments, via the event channel. After the networking state data has been transferred, the event channel between the RDMA server on the first PNIC and RDMA client on the second PNIC is terminated.

As the RDMA operation is performed between the first and second PNICs, the first VM migration module configured on the first host computer migrates the VM configuration state data to the second VM migration module configured on the second host computer. The data migration between the first and second VM migration modules and the RDMA operation between the first and second PNICs are performed asynchronously, according to some embodiments. The VM configuration state data is then used to configure the migrated VM on the second host computer.

In some embodiments, the first PNIC is associated with a set of physical ports that connect the first PNIC to a physical network, and each port in the set is associated with a particular identifier and a particular IP (Internet protocol) address that is assigned to the first PNIC. Before the second PNIC receives the notification from the second host computer that the data migration has started, a compatibility test is performed to ensure that the particular identifiers and particular IP addresses are available at the second host computer for the second PNIC. In some embodiments, when the identifiers and IP addresses are not available, another host computer is identified for the migration of the VM.

Additionally, the first and second PNICs of some embodiments each include a virtual switch. In some embodiments, the set of identifiers associated with the physical ports are also associated with a VNIC (virtual network interface card) of the VM. The set of identifiers, in some embodiments, are added to the virtual switch of the second PNIC, and the virtual switch assigns the set of identifiers to a set of interfaces of the virtual switch and associates the set of interfaces with the VNIC of the VM and uses the interfaces to forward data messages to and from the VNIC, according to some embodiments.

FIG. 1 conceptually illustrates a diagram 100 of a VM migration of some embodiments in which data from a smart NIC is transferred to a host computer using RDMA. As shown, the diagram 100 includes first and second host computers 110 and 115. The host computer 110 includes a VM 140 that is to be migrated to the host computer 115, a VM migration module (VMM) 150, VM and networking state data storage 170, an RDMA client 160, and a smart NIC 120. The host computer 115 includes a VMM 155, a storage for VM and networking state data 175 to be populated during a data migration operation for migrating the VM 140, an RDMA server 165, and a smart NIC 125.

The VMM 150 performs VM migration to migrate the VM 140 on the host computer 110 to the host computer 115. In some embodiments, the VMM 150 instantiates a VM from another host computer onto the host computer 110. The VMM 150 of some embodiments can be implemented in different areas of the host computer 110. For instance, in some embodiments, the VMM 150 is implemented in virtualization software (not shown) of the host computer 110 (e.g., a hypervisor of the host computer 110), while in other embodiments, the VMM 150 is implemented in user space or in a VM 140.

The smart NIC 120 includes an RDMA server 130 that has access to networking state data 132, and networking elements 134. The networking elements 134 of some embodiments store their state data in an RDMA-accessible memory (e.g., the networking state data storage 132), which can be directly accessed by the RDMA server 130. In this example, the smart NIC memory 136 is illustrated with a dashed outline and is crossed out to visually signify that the RDMA server 130 directly accesses the networking state data 132 without involving CPU of the smart NIC or host computer.

The networking elements 134, in some embodiments, include one or more forwarding elements and/or one or more middlebox service elements. As such, the networking state data 132 of some embodiments includes state data associated with L2 and/or L3 forwarding operations performed by the networking elements 134, and/or state data associated with one or more middlebox service operations (e.g., firewall operations, NAT operations, load balancing operations, IPS operations, IDS operations, etc.) performed by networking elements 134.

In some embodiments, the networking state data includes logical forwarding state data and logical middlebox service state data stored by logical networking elements. For instance, in some embodiments, the networking elements 134 include a logical forwarding element that is implemented by multiple managed forwarding elements on multiple PNICs and/or multiple host computers. The networking elements 134 of some embodiments also include logical middlebox service elements that are implemented by multiple physical middlebox service elements.

As mentioned above, the networking state data storage 132 is an RDMA-accessible memory, in some embodiments, that can be accessed by the RDMA server 130 without involving CPU. The RDMA server, in some embodiments, is able to directly access the memory of the smart NIC 120 to retrieve the networking state data due to specialized hardware of the smart NIC that enables such retrieval without involving CPU. In some embodiments, the RDMA server 130 accesses the networking state data storage 132 as though the networking state data storage 132 is part of the RDMA server's own memory.

As part of a data transfer for migrating the VM 140 from the host computer 110 to the host computer 115, the RDMA client 160 establishes an event channel 138 with the RDMA server 130 on the smart NIC 120. The RDMA client 160 uses the event channel 138 to request and receive networking state data 132 from the RDMA server 130. During the RDMA operation, the RDMA server 130 retrieves the networking state data from the storage 132 and transfers the data to the RDMA client 160. The networking state data is transferred as discrete messages (i.e., as opposed to streams of data) directly between buffers of the RDMA server 130 and RDMA client 160 via the event channel 138 using zero copy networking and without involving CPU.

When the RDMA client 160 of some embodiments receives the networking state data, the RDMA client 160 writes the received networking state data to the VM and networking state data storage 170 for retrieval by the VMM 150. The VMM 150 sends data retrieved from the VM and networking state data storage 170 to the VMM 155 on the second host computer 115. On the host computer 115, the VMM 155 of some embodiments stores the received VM and networking state data in the networking stage data storage 175. Additional details regarding the use of RDMA between host computers and PNICs as part of the VM migration will be described below by FIGS. 2A-2B.

Figure 2A:
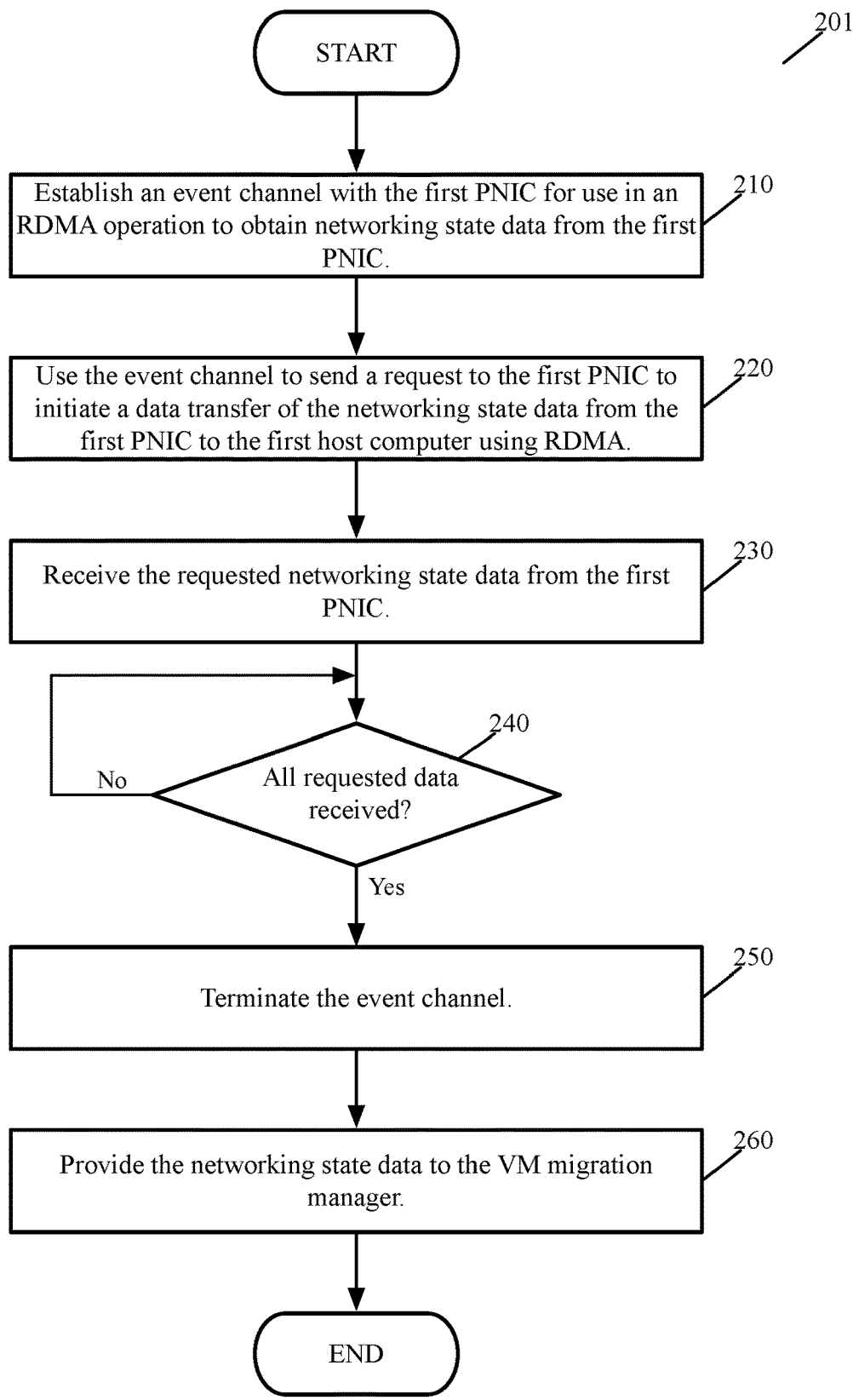
FIG. 2A conceptually illustrates a process performed in some embodiments to utilize RDMA to transfer networking state data associated with one or more operations performed by a first PNIC of a first host computer for a particular VM of the first host computer as part of a data migration for migrating the particular VM to a second host computer.

FIG. 2A conceptually illustrates a process 201 performed in some embodiments to utilize RDMA to transfer networking state data associated with one or more operations performed by a first PNIC of a first host computer for a particular VM of the first host computer as part of a data migration for migrating the particular VM to a second host computer. The process 201 is performed by an RDMA client configured on the first host computer. The process 201 will be described below with references to the diagram 100 described above.

The process 201 starts when the RDMA client establishes (at 210) an event channel with the first PNIC for use in an RDMA operation to obtain networking state data from the first PNIC. More specifically, the RDMA client establishes the event channel with an RDMA server configured on the first PNIC. The RDMA server is configured with access to the networking state data in order to provide the networking state data to the RDMA client on the first host computer. For instance, the host computer 110 includes the RDMA client 160 and the smartNIC 120 includes the RDMA server 130, which has access to the networking state data 132. The RDMA client 160 has an event channel 138 established with the RDMA server 130.

The process 201 uses (at 220) the event channel to send a request to the first PNIC to initiate a data transfer of the networking state data from the first PNIC to the first host computer using RDMA. In the diagram 100, for example, the RDMA client 160 requests networking state data 132 from the RDMA server 130 via the event channel 138. In some embodiments, responsive to the request, RDMA structures needed for fulfilling the request are allocated. For instance, after receiving the request from the RDMA client, in some embodiments, the RDMA server obtains context associated with the PNIC, a protection domain is allocated for the session, a completion channel for posting completion events and a completion queue are created, a work request for a completion queue notification is generated, a queue pair is created, and a direct byte buffer is allocated and registered for transferring the networking state data.

The process 201 receives (at 230) the requested networking state data from the first PNIC. The RDMA client on the first host computer receives the networking state data from the RDMA server on the first PNIC via the event channel. The requested networking state data includes data associated with one or more network forwarding operations, and/or one or more middlebox service operations performed on data messages by the first PNIC for the particular VM.

Examples of the network forwarding operations, of some embodiments, include layer 2 (L2) forwarding operations and layer 3 (L3) forwarding operations. These L2 and L3 forwarding operations are operations that are performed in some embodiments by logical forwarding elements implemented on the PNIC. In some embodiments, header values of data message flows are used to determine where and how to forward data messages belonging to the data message flows. The logical forwarding elements implemented by the PNIC of some embodiments perform the L2 and L3 forwarding operations based on L2 and L3 network addresses.

In some embodiments, examples of the middlebox service operations include firewall service operations, load balancing service operations, network address translation (NAT) service operations, intrusion detection service (IDS) operations, intrusion prevention service (IPS) operations, etc. The middlebox service operations are service operations that are offloaded from the host computer to the PNIC, according to some embodiments. As will be further described below, an operating system (OS) of the PNIC of some embodiments executes a virtualization program that is similar to a hypervisor and that enables resources (e.g., memory, CPU, etc.) of the PNIC to be shared among multiple machines (e.g., multiple VMs) that execute on the same host computer as the PNIC. The virtualization program of some embodiments provides compute and/or network virtualization services. In some embodiments, the network virtualization services perform the middlebox service operations.

Returning to the process 201, the process determines (at 240) whether all requested data has been received. When the RDMA client on the first host computer has not yet received all requested data, the RDMA client continues to wait until all requested data has been received. When the RDMA client on the first host computer has received all requested data, the process 201 transitions to terminate (at 250) the event channel between the RDMA client on the first host computer and the RDMA server on the first PNIC. In some embodiments, the RDMA client on the first host computer also generates an event indicating the event channel has been terminated.

The process 201 then provides (at 260) the networking state data to the VMM. For example, in the diagram 100, the RDMA client 160 on the host computer 110 provides the networking state data received from the RDMA server 130 of the smart NIC 120 to the VM and networking state data storage 170 where it can be retrieved by the VMM 150. The VMM 150 sends the VM and networking state data it retrieves from the VM and networking state data storage 170 to the VMM 155 on the host computer 115 as part of migrating the VM 140 from the host computer 110 to the host computer 115. Following 260, the process 201 ends.

Figure 2B:
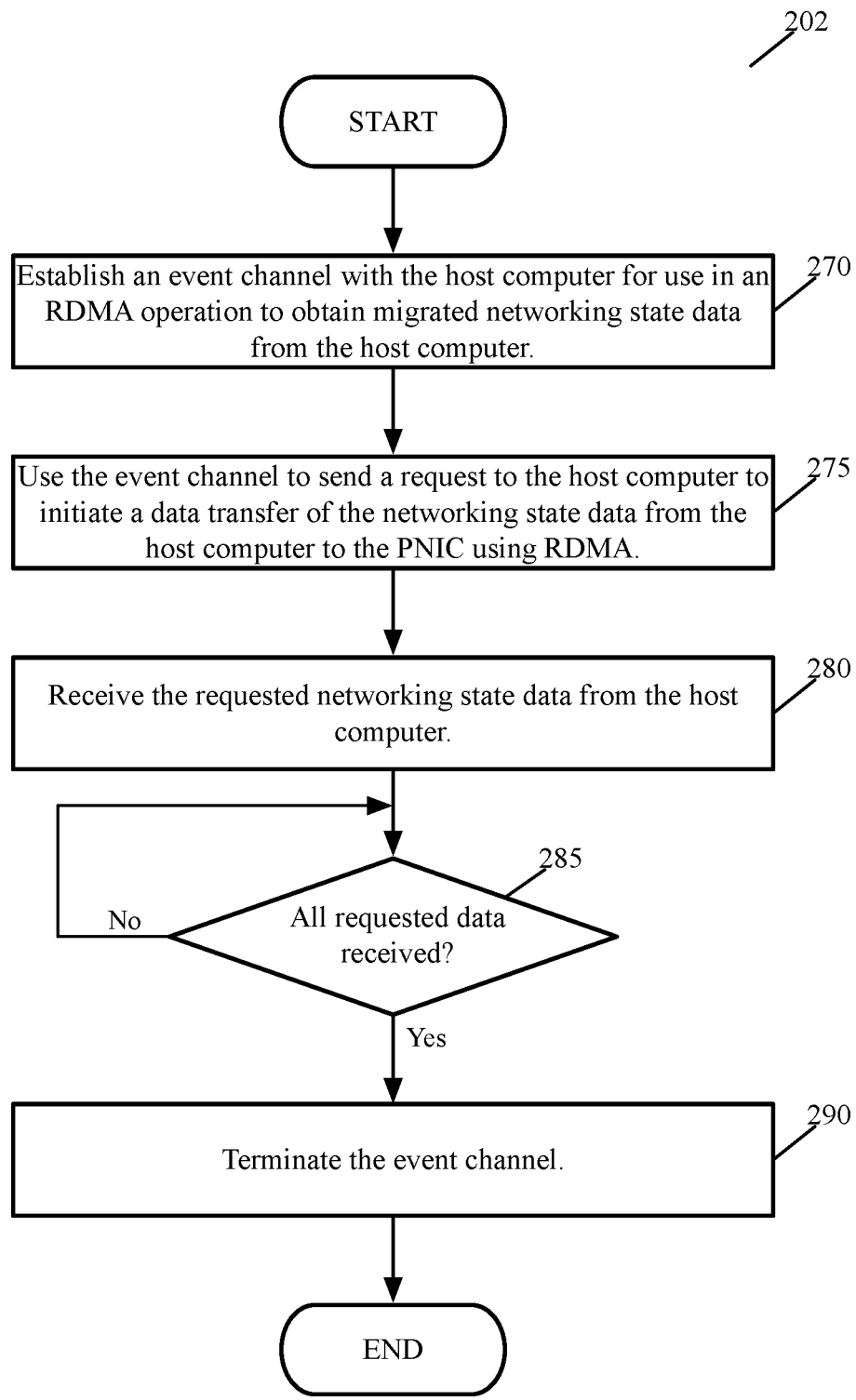
FIG. 2B conceptually illustrates a process performed in some embodiments to utilize RDMA to transfer networking state data associated with one or more operations to be performed by PNIC of a host computer to which a particular VM has been migrated.

When the networking state data is received by the destination host computer, an additional RDMA operation is performed in some embodiments between the destination host computer and the PNIC of the destination host computer. FIG. 2B conceptually illustrates a process 202 performed in some embodiments by an RDMA client configured on the PNIC of the host computer to which the particular VM is migrated to obtain the networking state data migrated to the host computer from an RDMA server configured on the host computer. The process 202 will be described below with references to the diagram 100.

The process 202 starts when the RDMA client on the PNIC establishes (at 270) an event channel with the host computer to obtain the migrated networking state data from the host computer. As illustrated in the diagram 100, for example, the smart NIC 125 includes an RDMA client 180 and the host computer 115 includes an RDMA server 165. The RDMA client 180 on the smart NIC 125 and the RDMA server 165 on the host computer 115 are connected by an event channel 188, as shown. In some embodiments, the RDMA client establishes the event channel with the RDMA server after receiving a notification from the host computer that the networking state data has been migrated and is available for transfer to the PNIC.

The process 202 uses (at 275) the event channel to send a request to the host computer to initiate a data transfer of the networking state data from the host computer to the PNIC using RDMA. The networking state data on the host computer is stored in an RDMA accessible memory for retrieval by the RDMA server, according to some embodiments. In the diagram 100, for instance, the RDMA server 165 has access to the VM and networking state data storage 175. While illustrated as a single storage for the VM configuration state data and the networking state data, in other embodiments, the VM configuration state data and networking state data are stored in separate storage structures.

The process 202 receives (at 280) the requested networking state data from the host computer. When the RDMA server 165 receives the request for the networking state data from the RDMA client 180, the RDMA server 165 of some embodiments retrieves the networking data from the VM and networking state data storage 175 (or other RDMA accessible storage location used to store the networking state data) and transfers the networking state data to the RDMA client 180 via the event channel 188. In some embodiments, the networking state data is transferred directly to the memory of the PNIC from the RDMA client without the involvement of CPU.

The process 202 determines (at 285) whether all of the requested data has been received. When the RDMA client on the PNIC has not yet received all requested data, the RDMA client continues to wait until all requested data has been received. When the RDMA client on the PNIC has received all requested data, the process 202 transitions to terminate (at 290) the event channel. In some embodiments, the RDMA client also generates an event indicating the event channel has been terminated. Following 290, the process 202 ends.

Figure 3:
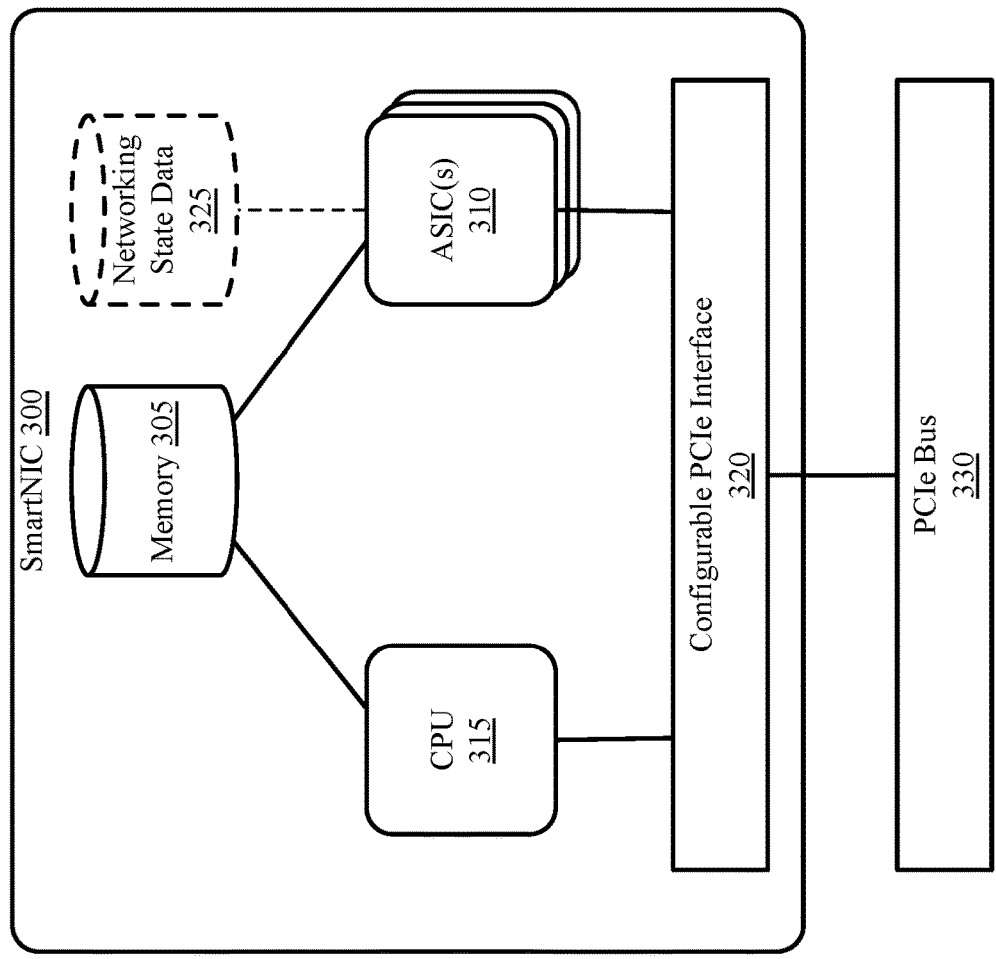
FIG. 3 illustrates the hardware of a smart NIC of some embodiments that can be configured to perform network forwarding and middlebox service offload for a host computer.

In some embodiments, smart NICs include additional elements to those illustrated by the diagram 100. For instance, FIG. 3 illustrates the hardware of a smart NIC 300 of some embodiments that can be configured to perform network forwarding and middlebox service offload for a host computer. As shown, the smart NIC 300 includes its own general-purpose (x86) CPU 315, a set of application-specific integrated circuit (ASICs) 310, a memory 305, and a configurable Peripheral Component Interconnect Express (PCIe) interface 320. In some embodiments, the smart NIC 300 also includes a networking state data storage 325. The ASICs 310, in some embodiments, include at least one I/O ASIC that handle the processing of data messages forwarded to and from the computer, and are at least partly controlled by the CPU 315. In some embodiments, either in addition to or as an alternative to the ASICs, the smart NIC may include a set of configurable field-programmable gate arrays (FPGAs).

The configurable PCIe interface 320 enables connection of the smart NIC 300 to the other physical components of a computer system (e.g., the x86 CPU, memory, etc.) via the PCIe bus 330 of the computer system. Via this configurable PCIe interface, the smart NIC 300 can present itself to the computer system as a multitude of devices, including a data message processing NIC, a hard disk (using non-volatile memory express (NVMe) over PCIe), or other types of devices. The CPU 315 executes a NIC operating system (OS) in some embodiments that controls the ASICs 310 and can perform other operations as well. In some embodiments, a network forwarding and middlebox service offload ASIC 310 performs the operations to offload the network forwarding and middlebox service from a host computer.

Figure 4:
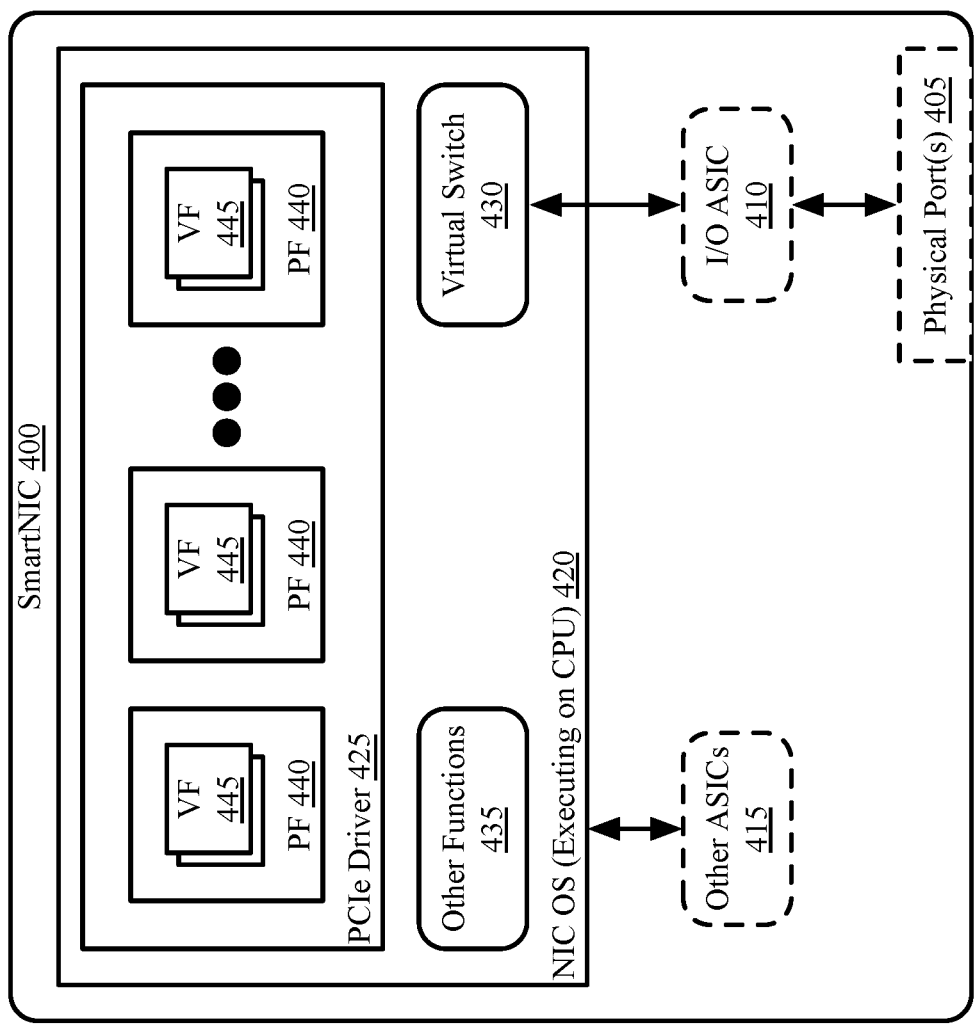
FIG. 4 conceptually illustrates the NIC OS of a smart NIC of some embodiments.

FIG. 4 conceptually illustrates the NIC OS 420 of a smart NIC 400 of some embodiments. In addition to the NIC OS 420, the smart NIC 400 includes an I/O ASIC 410, physical port(s) 405, and, in some embodiments, other ASICs 415. The NIC OS 420 is executed, in some embodiments, by the CPU of the smart NIC (e.g., CPU 315). This NIC OS 420 includes a PCIe driver 425, a virtual switch 430, and other functions 435.

The PCIe driver 425 includes multiple physical functions 440, each of which is capable of instantiating multiple virtual functions 445. These different physical functions 440 enable the smart NIC to present as multiple different types of devices to the computer system to which it attaches via its PCIe bus 330. For instance, the smart NIC can present itself as a network adapter (for processing data messages to and from the computer system) as well as a non-volatile memory express (NVMe) disk in some embodiments.

The NIC OS 420 of some embodiments is capable of executing a virtualization program (similar to a hypervisor) that enables sharing resources (e.g., memory, CPU resources) of the smart NIC among multiple machines (e.g., VMs) if those VMs execute on the computer. The virtualization program can provide compute virtualization services and/or network virtualization services similar to a managed hypervisor in some embodiments. These network virtualization services, in some embodiments, include segregating data messages into different private (e.g., overlay) networks that are defined over the physical network (shared between the private networks), forwarding the data messages for these private networks (e.g., performing switching and/or routing operations), and/or performing middlebox services for the private networks.

To implement these network virtualization services, the NIC OS 420 of some embodiments executes the virtual switch 430. The virtual switch 430 enables the smart NIC to perform software-defined networking and provide the I/O ASIC 410 of the smart NIC 400 with a set of flow entries (e.g., the cache entries described herein) so that the I/O ASIC 410 can perform flow processing offload (FPO) for the computer system in some embodiments. The I/O ASIC 410, in some embodiments, receives data messages from the network and transmits data messages to the network via one or more physical network ports 405.

The other functions 435 executed by the NIC operating system 400 of some embodiments can include various other operations, including operations not directly related to data message processing (e.g., operations for a machine-learning system). In addition, the NIC operating system 400 (either the virtual switch 430 or other functions 435 of the operating system) may perform various cache entry validation and invalidation operations and maintain a rule update table used to perform the cache entry validation.

As noted, the smart NIC of some embodiments processes data messages using cache entries (e.g., cache entries installed by a software forwarding element (SFE) executing on a computer for which the smart NIC is the interface) such that at least a subset of the data messages received at the smart NIC can be processed without a need to provide the data messages to the SE. Data message processing by the smart NIC ASIC tends to be faster than processing by the SE, even before accounting for the savings realized by avoiding the need to pass the data messages to and from the computer (e.g., via the PCIe interface).

Figure 5:
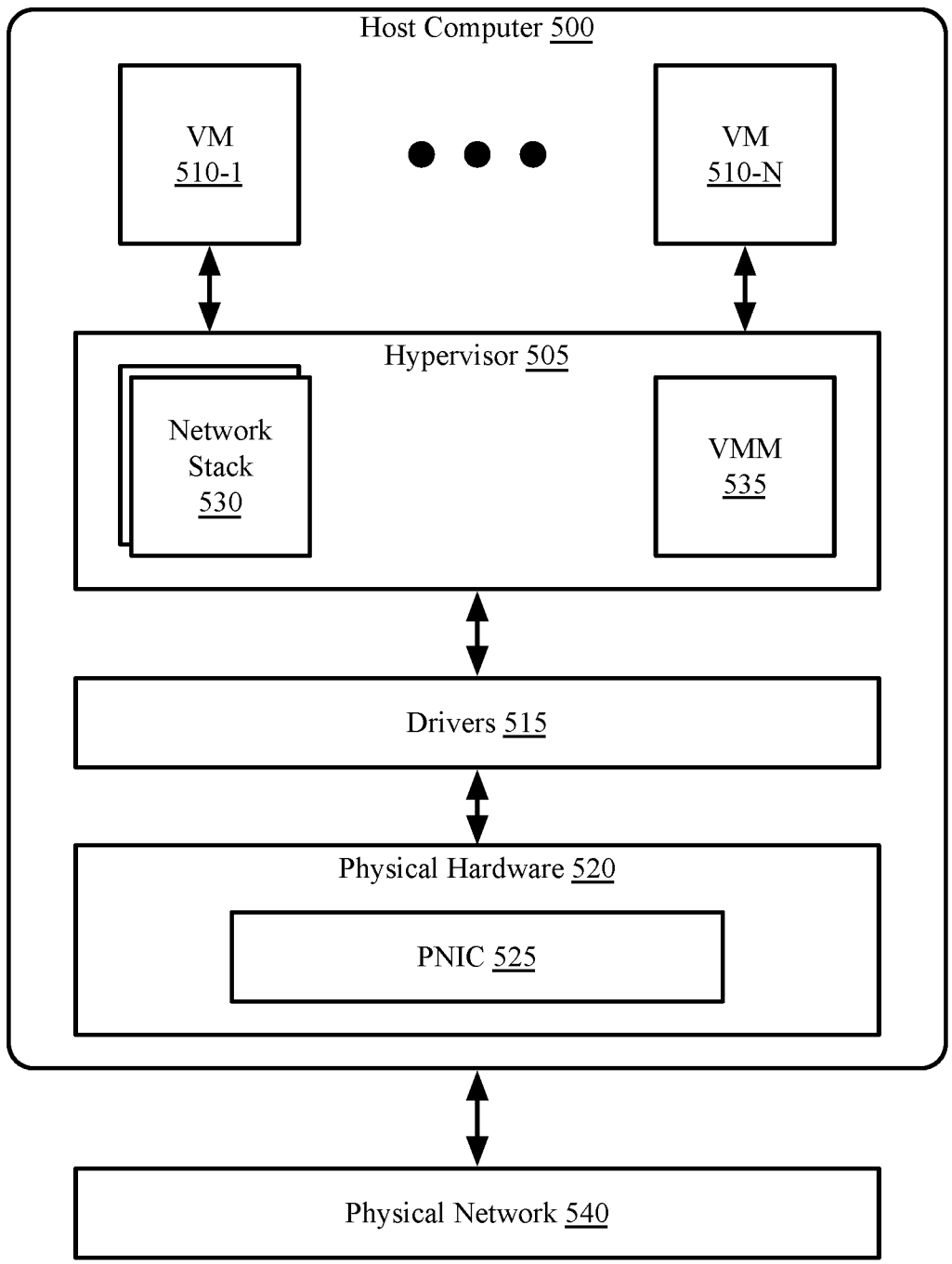
FIG. 5 illustrates an example host computer that offloads network forwarding operations and middlebox service operations to a PNIC executing as part of the physical hardware of the host computer.

FIG. 5 illustrates an example host computer 500 that offloads network forwarding operations and middlebox service operations to a PNIC 525 executing as part of the physical hardware 520 of the host computer 500. A host computer 500 of some embodiments is linked to other devices, such as other host computers, through a physical network 540. Host computer 500 may perform processing of network traffic (e.g., data messages).

Host computer 500 may include a hypervisor 505 (e.g., virtualization software) and VMs 510-1 to 510-N. As used herein, the term hypervisor may refer generally to a software layer or component that supports the execution of multiple VMs including system-level software that supports name space containers. Host computer 500 provides resources to allow VMs 510 to send and receive data messages to and from the physical network 540. In some embodiments, the hypervisor 505 includes a network stack 530 for each VM 510 that processes data messages. The network stack 530 may perform operations on the data messages in software using the hypervisor 505. The operations that are performed may be defined by protocols, such as Transfer Control Protocol (TCP/Internet Protocol (IP). The network stack 530 may include an input/output (I/O) chain that may perform network operations related to the delivery and reception of data messages as well as other operations.

Host computer 500 also includes physical hardware 520, which includes hardware devices for the host computer 500, such as CPUs, storage, etc. The physical hardware 520 also includes a PNIC 525, which is in some embodiments the physical interface for the host computer 500 to the physical network 540. For example, the PNIC 525 is an interface that is used to send data messages from VMs 510 to the physical network 540 and also to receive data messages from the physical network 540 that are destined to the VMs 510. In the receive scenario, the PNIC 525 includes queues (not shown) that store data messages that the PNIC 525 receives. Queues buffer the incoming data messages that are received from the physical network 510, but the queue may also perform other operations. Then, drivers 515 read the data messages corresponding to queues for further processing by the network stack 530.

Note that the above explanation, and other explanations herein, may reflect a common interpretation or abstraction of actual processing mechanisms. For instance, data messages may not actually be stored in queues, but instead descriptors or pointers to data messages may be stored in the queue, while the data messages themselves are actually stored in host memory. It is conventional to refer to these descriptors/pointers that identify a data message as the data messages themselves to abstract away complexity and explain higher level operations without burdening the reader with unnecessary technical details of well understood mechanisms. Such abstractions in the descriptions herein should not be construed as limiting in any way.

A VMM 535 may perform VM migration to migrate any of the VMs 510 on the host computer 500 to another host computer, or to instantiate a VM from another host computer onto the host computer 500. However, the VMM 535 may be implemented in other areas, such as in user space or in a VM 510. When network forwarding and/or middlebox service operations are offloaded from the hypervisor 505 to the PNIC 525, the VMM 535 of some embodiments requests the PNIC 525 for state information regarding VMs in the event of a VM migration.

Figure 6:
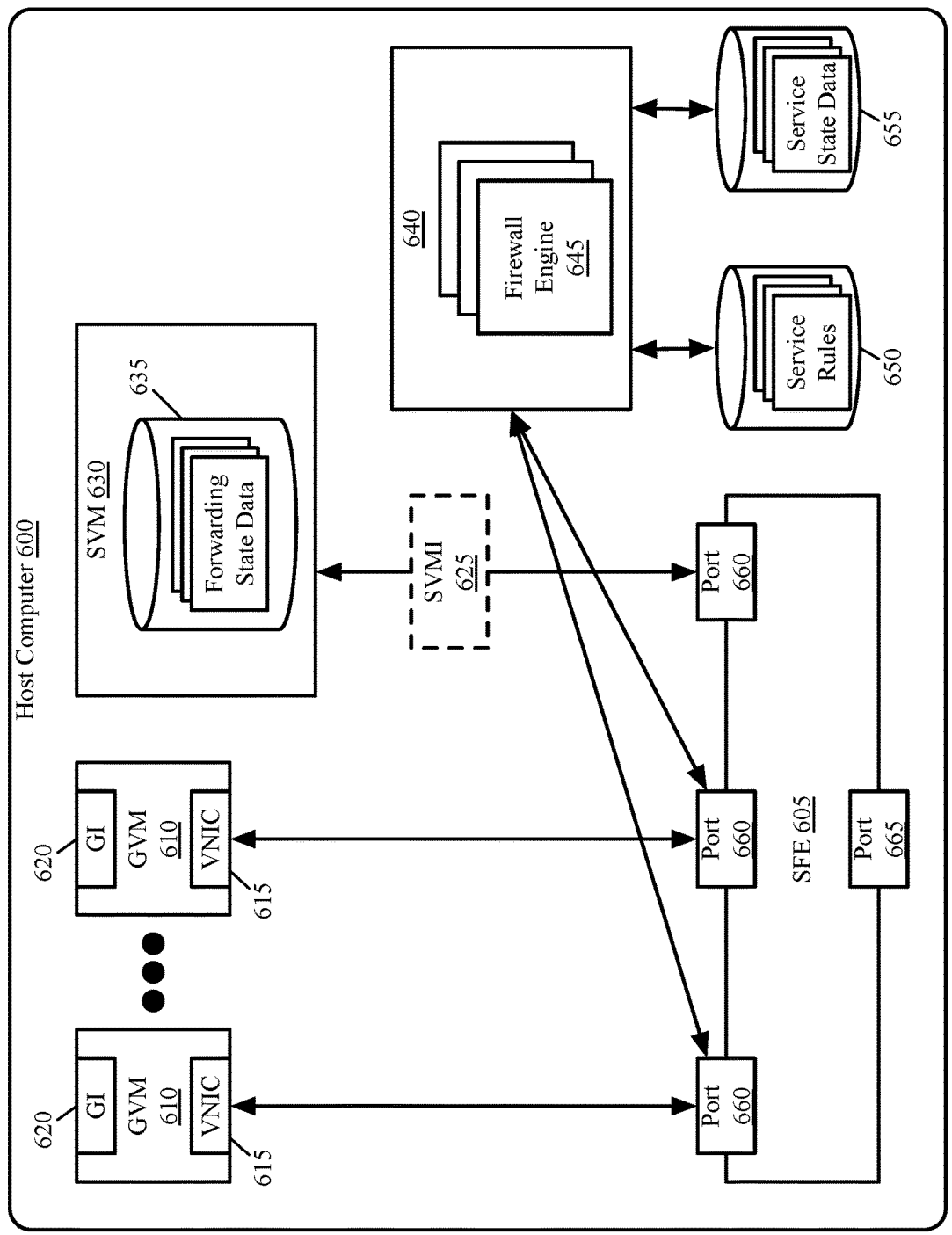
FIG. 6 illustrates a more-detailed example of a host computer that in some embodiments is used to establish a distributed architecture for offloading network forwarding operations and/or middlebox service operations to a PNIC (not shown).

FIG. 6 illustrates a more-detailed example of a host computer 600 that in some embodiments is used to establish a distributed architecture for offloading network forwarding operations and/or middlebox service operations to a PNIC (not shown). This host computer 600 includes service engines 620, a service rule storage 650, a service state information storage 655, guest VMs (GVMs) 610, and an SVM 630. The service engines 620 in this example include a firewall engine 645, but other embodiments may include any or more types of service engines (e.g., discovery, process control, encryption, load balancer, etc.).

On the host computer 600, the GVMs 610 execute on a hypervisor. Also, the host computer 600 includes an SFE 605. In some embodiments, the SFE 605, the service engines 620, the service rule storages 650, and the service state information storage 655 operate in the kernel space of the hypervisor, while the GVMs 610 and SVM 630 operate in the hypervisor's user space. In other embodiments, one or more service engines are user space modules (e.g., are SVMs). The SVMs of some embodiments execute in virtualization software of the PNIC. During a VM migration, the service rules storages 650 and service state information storage 655 are migrated to the destination host computer in addition to the networking state data stored by the PNIC, in some embodiments.

In some embodiments, the GVMs 610 serve as data end points in the datacenter. Examples of such machines include webservers, application servers, database servers, etc. In some cases, al the VMs belong to one entity, e.g., an enterprise that operates the host. In other cases, the host computer 600 operates in a multi-tenant environment (e.g., in a multi-tenant data center), and different GVMs 610 may belong to one tenant or to multiple tenants.

As shown, each GVM 610 also includes a virtual network interface card (VNIC) 615 in some embodiments. Each VNIC is responsible for exchanging messages between its VM and the SFE 605. Each VNIC connects to a particular port 660 of the SFE 605. The SFE 605 also connects to a PNIC (not shown) of the host computer 600. In some embodiments, the VNICs are software abstractions created by the hypervisor of one or more PNICs of the host computer 600. Additionally, the GVMs 610 each may include a guest introspection (GI) agent 620 that perform GI operations for the GVMs 610.

In some embodiments, the SFE 605 maintains a single port 660 for each VNIC of each GVM 610 and for the SVM 630. The SFE 605 connects to the host PNIC (through a NIC driver (not shown)) to send outgoing messages and to receive incoming messages. In some embodiments, the SFE 605 is defined to include a port 665 that connects to the PNIC's driver to send and receive messages to and from the PNIC. The host PNIC of some embodiments also performs network forwarding and middlebox service operations for the host computer 600.

The SFE 605 performs message-processing operations to forward messages that it receives on one of its ports to another one of its ports. For example, in some embodiments, the SFE tries to use data in the message (e.g., data in the message header) to match a message to flow based rules, and upon finding a match, to perform the action specified by the matching rule (e.g., to hand the message to one of its ports 660 or 665, which directs the message to be supplied to a destination VM or to the PNIC).

In some embodiments, the SFE 605 is a software switch, while in other embodiments it is a software router or a combined software switch/router. The SFE 605 in some embodiments implements one or more logical forwarding elements (e.g., logical switches or logical routers) with SFEs executing on other hosts in a multi-host environment. A logical forwarding element in some embodiments can span multiple hosts to connect VMs that execute on different hosts but belong to one logical network.

Different logical forwarding elements can be defined to specify different logical networks for different users, and each logical forwarding element can be defined by multiple SFEs on multiple hosts. Each logical forwarding element isolates the traffic of the VMs of one logical network from the VMs of another logical network that is serviced by another logical forwarding element. A logical forwarding element can connect VMs executing on the same host and/or different hosts. In some embodiments, the SFE extracts from a data message a logical network identifier (e.g., a VNI) and a media access control (MAC) address. The SFE in these embodiments uses the extracted VNI to identify a logical port group, and then uses the MAC address to identify a port within the port group.

Software switches (e.g., software switches of hypervisors) are sometimes referred to as virtual switches because they operate in software and they provide the VMs with shared access to the PNIC(s) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. Virtual Extensible Local Area Network (VXLAN) provides one manner for creating such logical switches. The VXLAN standard is described in Mahalingam, Mallik; Dutt, Dinesh G.; et al. (2013 May 8), VXLAN: A Framework for Overlaying Virtualized Layer 2 Networks over Layer 3 Networks, IETF.

The ports 660 of the SFE 605 in some embodiments include one or more function calls to one or more modules that implement special input/output (I/O) operations on incoming and outgoing messages that are received at the ports. Examples of I/O operations that are implemented by the ports 660 include Address Resolution Protocol (ARP) broadcast suppression operations and Dynamic Host Configuration Protocol (DHCP broadcast suppression operations, as described in U.S. Pat. No. 9,548,965. Other I/O operations (such as firewall operations, load-balancing operations, network address translation operations, etc.) can be so implemented in some embodiments of the invention. By implementing a stack of such function calls, the ports can implement a chain of I/O operations on incoming and/or outgoing messages in some embodiments. Also, in some embodiments, other modules in the data path (such as the VNICs 615, ports 660, etc.) implement the I/O function call operations instead of, or in conjunction with, the ports 660 In some embodiments, the SFE 605 communicates with the SVM 630, like with the GVMs 610, using a port 660. In other embodiments, to communicate with the SVM 630, the SFE 605 uses the port 660 and an SVM interface (SVMI) 625.

In some embodiments, one or more of function calls of the SFE ports 660 can be to one or more service engines 620 that process service rules in the service rule storages 650. Each service engine 650 in some embodiments has its own service rule storage 650 and service state information storage 655. The host computer 600 includes just one service rule storage 650 and service state information storage 655 for all the service engines in order not to obscure the presentation in this figure with unnecessary detail. Also, in some embodiments, each GVM 610 has its own instance of each service engine 640 (e.g., its own firewall engine 645). In other embodiments, one service engine can service data message flows for multiple VMs on a host (e.g., VMs for the same logical network).

The service engine 640 of some embodiments maintains middlebox service operation state information in the storage 655 to provide to another host computer in the event of migration of one or more of the GVMs 610. In such embodiments, the PNIC of the host computer 600 does not perform middlebox service operations for the host. The service engine 640 may retrieve state information regarding a particular VM from the storage 655 to provide to the other host computer such that the other host computer will receive the service state information for the particular GVM. In other embodiments, when the PNIC performs middlebox service operations for the host computer 600, the PNIC maintains this state information and the state information is transferred to either the host computer using RDMA, as also described above, or to a PNIC of a destination host computer using RDMA, as will be described further below.

The SVM 630 is in some embodiments a host forwarding module of the host computer 600 that maintains the network forwarding state information for the GVMs 610. In such embodiments, the PNIC of the host computer 600 does not perform network forwarding operations for the host. This forwarding operation state information may be provided to the SVM 630 along with configuration state information by the GI agents 620. The SVM 630 of some embodiments includes a forwarding state information storage 635 for storing state information for each VM (e.g., configuration state information, forwarding operation state information, etc.) to provide to another host computer when one or more VMs are migrated to the other host. The SVM 630 may retrieve state information regarding a particular VM from the storage 635 to provide to the other host computer such that the other host computer on which the VM is being migrated to will receive the forwarding state information for the particular VM. In other embodiments, when the PNIC performs network forwarding operations for the host computer 600, the PNIC maintains this state information and during VM migration, the state information is transferred either from the PNIC to the host computer using RDMA, or from the PNIC to the destination host's PNIC using RDMA. The SVM 630 in these embodiments may still maintain configuration state information for the GVMs 610 in the storage 635, and, in some embodiments, this configuration state information is migrated during the data migration from the source host to the destination host.

As mentioned above, as an alternative to using RDMA between a host computer and a PNIC of the host computer to obtain networking state data for, e.g., a VM migration operation to migrate a VM from a first host computer to a second host computer, some embodiments use RDMA between a first PNIC of a first host computer from which a VM is being migrated and a second PNIC of a second host computer to which the VM is being migrated.

Figure 7:
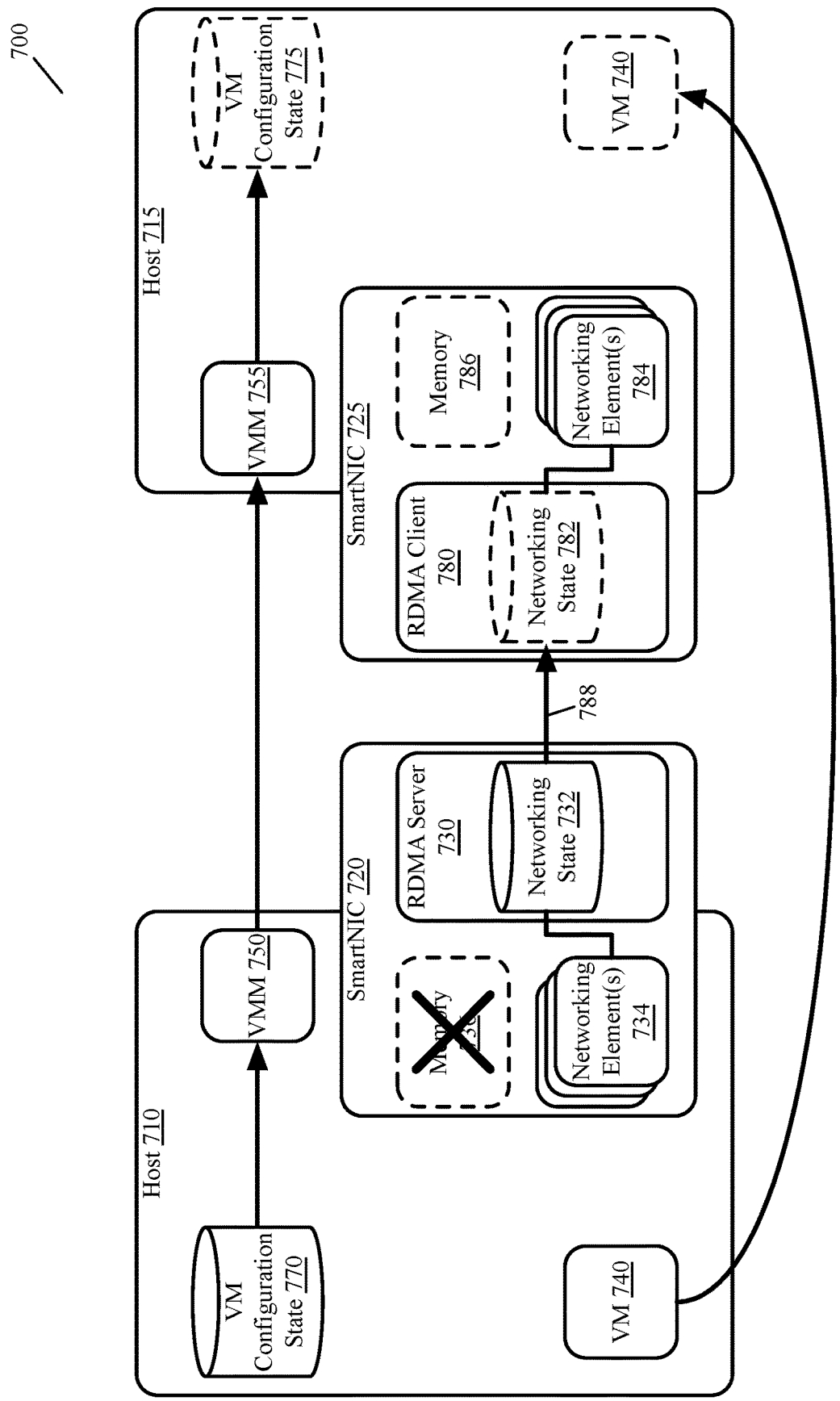
FIG. 7 conceptually illustrates a diagram of some embodiments in which RDMA is used to transfer networking state data from a first smart NIC of a first host computer to a second smart NIC of a second host computer.

FIG. 7 conceptually illustrates a diagram 700 of some embodiments in which RDMA is used to transfer networking state data from a first smart NIC of a first host computer to a second smart NIC of a second host computer. As shown, the diagram 700 includes a host computer 710 and a host computer 715. The host computer 710 includes a VM 740 that is to be migrated to the host computer 715, a VM configuration state data storage 770, a VMM 750, and a smart NIC 720. The host computer 715 includes a VMM 755, and a smart NIC 725.

The smart NIC 720 includes an RDMA server 730 that has access to networking state data 732, networking elements 734, and a memory 736. The smart NIC 725 includes an RDMA client 780, networking elements 784, and memory 786. Like the diagram 100, the smart NIC memory 736 is illustrated with a dashed outline and is crossed out to visually signify that the RDMA server 730 directly accesses the networking state data 732 without involving the OS (e.g., CPU) of the smart NIC or host computer.

When the VMM 750 on the first host computer and the VMM 755 on the second host computer begin a data transfer as part of migrating the VM 140 from the first host computer 710 to the second host computer 715, the VMM 755 on the second host computer 715 notifies the RDMA client 780 on the smart NIC 725 that the data transfer has started so that the RDMA client 780 can establish an event channel 738 with the RDMA server 730 on the smart NIC 720 to use to request and receive networking state data associated with operations performed by the networking elements 734 on data messages for the VM 740.

On the first host computer 710, the VMM 750 retrieves VM configuration state data associated with a configuration of the VM 740 and transfers this data to the VMM 755, which writes the data to a VM configuration state data storage 775 on the host computer 715. The VM configuration state data in the storage 775 is then used to configure the VM 740 on the host computer 715. On the smart NIC 725, the networking state data received from the smart NIC 720 is used to configure the networking elements 784. Additional details regarding the use of RDMA to transfer networking state data between smart NICs will be further described below by FIG. 8.

Figure 8:
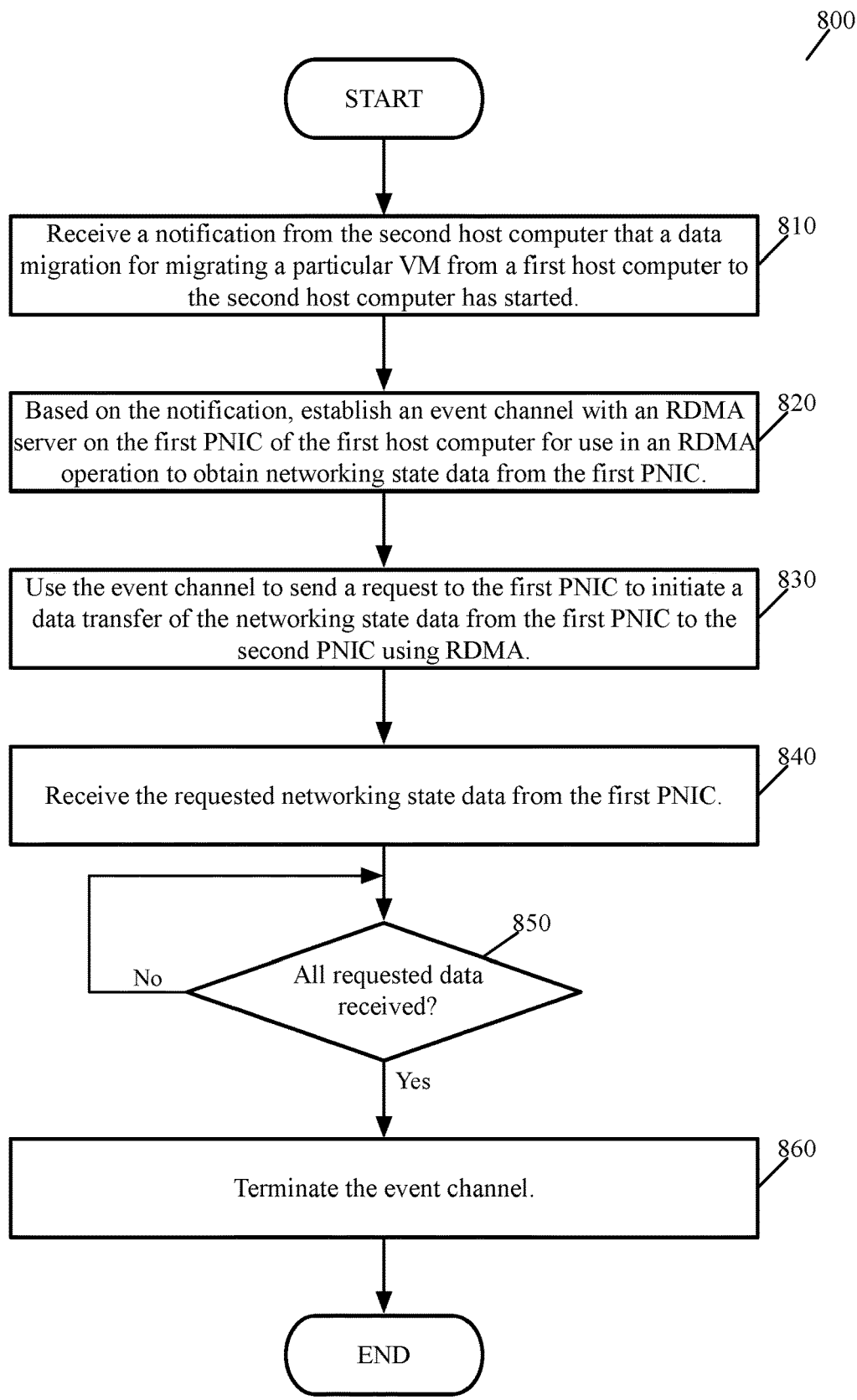
FIG. 8 conceptually illustrates a process performed in some embodiments to use RDMA to transfer data from a first PNIC of a first host computer to a second PNIC of a second host computer.

FIG. 8 conceptually illustrates a process 800 performed in some embodiments to use RDMA to transfer data from a first PNIC of a first host computer to a second PNIC of a second host computer. The process 800 is performed in some embodiments by an RDMA client configured on the second PNIC. The process 800 will be described below with references to the diagram 200.

The process 800 starts when the RDMA client on the second PNIC receives (at 810) a notification from the second host computer that a data migration for migrating a particular VM from the first host computer to the second host computer has started. In some embodiments, the RDMA client on the second PNIC receives the notification from a VMM on the second host computer. For instance, in the diagram 700, the RDMA client 780 receives the notification from the VMM 755 on the host computer 715 once the VMM 755 begins the data migration with the VMM 750 on the host computer 710.

Based on the notification, the process 800 establishes (at 820) an event channel with an RDMA server configured on the first PNIC of the first host computer for use in an RDMA operation to obtain networking state data from the first PNIC. This event channel allows the networking state data to be transferred from the first PNIC to the second PNIC without involving the CPU of either host. For example, the RDMA client 780 establishes an event channel 738 with the RDMA server 730 in the diagram 700.

The process 800 uses (at 830) the event channel to send a request to the RDMA server of the first PNIC to initiate a data transfer of the networking state data from the first PNIC to the second PNIC using RDMA. One or more forwarding elements of the first PNIC and one or more middlebox elements of the first PNIC store their networking state data in an RDMA accessible memory, according to some embodiments. The RDMA server on the first PNIC retrieves the networking state data from said accessible memory and uses RDMA to transfer the retrieved networking state data to the RDMA client on the second PNIC via the event channel. In the diagram 700, for example, the RDMA server 730 has access to the networking state data 732, and uses RDMA to transfer that data to the RMA client 780 via the event channel 788.

The process 800 receives (at 840) the requested networking state data from the RDMA server of the first PNIC. In some embodiments, as the RDMA client on the second PNIC receives the networking state data, the RDMA client stores the received networking state data in a networking state data storage of the second PNIC. For instance, the RDMA client 780 on the host computer 715 has access to the networking state data 782. In other embodiments, the networking state data is written directly to the memory 786 of the second PNIC 780.

The process 800 determines (at 850) whether all requested data has been received. When the RDMA client on the first host computer has not yet received all requested data, the RDMA client continues to wait until all requested data has been received. When all the requested data has been received, the process 800 transitions to terminate (at 860) the event channel. The RDMA client on the second PNIC also generates an event indicating the event channel has been terminated, in some embodiments. Following 860, the process 800 ends.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
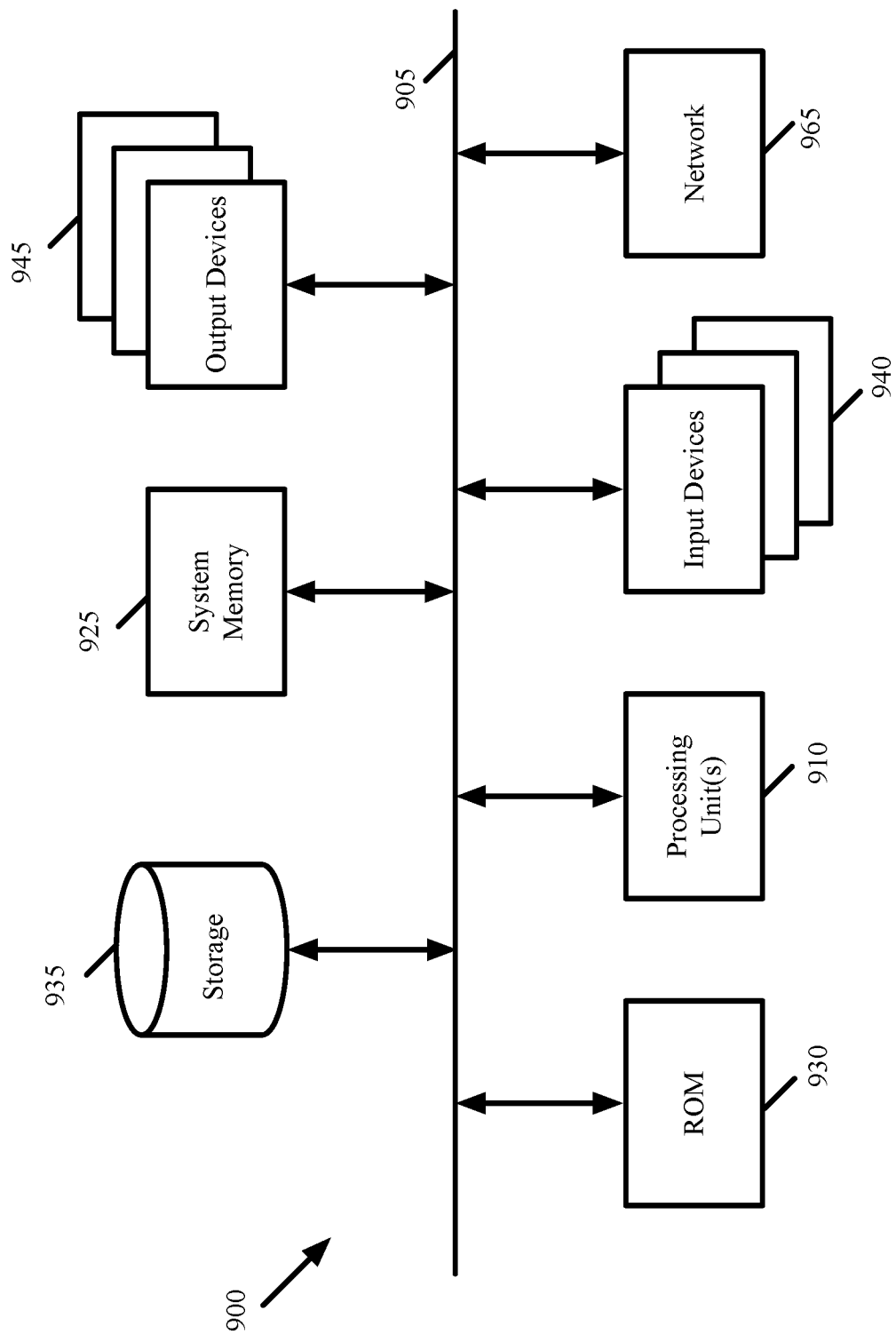
FIG. 9 conceptually illustrates a computer system with which some embodiments of the invention are implemented.

FIG. 9 conceptually illustrates a computer system 900 with which some embodiments of the invention are implemented. The computer system 900 can be used to implement any of the above-described hosts, controllers, gateway, and edge forwarding elements. As such, it can be used to execute any of the above described processes. This computer system 900 includes various types of non-transitory machine-readable media and interfaces for various other types of machine-readable media. Computer system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the computer system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) 910 may be a single processor or a multi-core processor in different embodiments. The read-only-memory (ROM) 930 stores static data and instructions that are needed by the processing unit(s) 910 and other modules of the computer system 900. The permanent storage device 935, on the other hand, is a read-and-write memory device. This device 935 is a non-volatile memory unit that stores instructions and data even when the computer system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory 925 is a volatile read-and-write memory, such as random access memory. The system memory 925 stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices 940 enable the user to communicate information and select commands to the computer system 900. The input devices 940 include alphanumeric keyboards and pointing devices (also called "cursor control devices"). The output devices 945 display images generated by the computer system 900. The output devices 945 include printers and display devices, such as cathode ray tubes (CRT) or liquid crystal displays (LCD). Some embodiments include devices such as touchscreens that function as both input and output devices 940 and 945.

Finally, as shown in FIG. 9, bus 905 also couples computer system 900 to a network 965 through a network adapter (not shown). In this manner, the computer 900 can be a part of a network of computers (such as a local area network ("LAN"), a wide area network ("WAN"), or an Intranet), or a network of networks (such as the Internet). Any or all components of computer system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of migrating a particular virtual machine (VM) from a first host computer to a second host computer, the first host computer having a first physical network interface card (PNIC) that performs at least one of network forwarding operations and middlebox service operations for the particular VM, the second host computer having a second PNIC for performing at least one of networking forwarding operations and middlebox service operations for the particular VM, the method comprising:

at an RDMVA (Remote Direct Memory Access) client executing on a set of one or more processors of the second PNIC of the second host computer:

receiving a notification from the second host computer indicating a data migration that is performed to migrate the particular VM from the first host computer to the second host computer has started;

based on the notification, directing an RDMA server executing on the first PNIC to provide networking state data associated with at least one of network forwarding operations and middlebox service operations that the first PNIC performs for the particular VM, wherein said provided networking state data resides in a memory of the first PNIC that is accessible to the RDMVA server;

after a migration, deleting the networking state data from the RDMA server;

configuring the second PNIC by writing the networking state data to a memory of the second PNIC and enabling, based on the networking state data, a forwarding element and a middlebox element of the second PNIC to perform the network forwarding operations and the middlebox service operations for the particular VM;

the first PNIC is associated with a set of physical ports that connect the first PNIC to a physical network;

each port in the set of physical ports is associated with (i) a particular identifier and (ii) a particular IP (Internet Protocol) address assigned to the first PNIC;

before receiving the notification, a compatibility test is performed to ensure the particular identifiers and particular IP addresses assigned to the first PNIC are available at the second host computer; and wherein when the particular IP addresses are not available at the second host computer, a third host computer at which the particular IP addresses are available is identified for the data migration to migrate the particular VM from the first host computer to the third host computer.

2. The method of claim 1, wherein said directing comprises: establishing communication with the RDMA server on the first PNIC of the first host computer; and using the established communication to perform an RDMA operation to obtain the networking state data from the RDMA server on the first PNIC.

3. The method of claim 2, wherein establishing communication with the RDMA server comprises establishing an event channel with the RDMA server.

4. The method of claim 3, wherein the at least one of network forwarding operations and middlebox service operations are performed by at least one forwarding element of the first PNIC and at least one middlebox element of the first PNIC, wherein the PNIC forwarding element and middlebox element store their state data in the RDMA accessible memory.

5. The method of claim 3, wherein after the RDMA client on the second PNIC obtains the networking state data from the RDMA server on the first PNIC, the method further comprises terminating the event channel.

6. The method of claim 1, wherein the data migration is performed by a first VM migration module executing on the first host computer that transfers data associated with the particular VM to a second VM migration module executing on the second host computer.

7. The method of claim 6, wherein the data associated with the particular VM comprises configuration state data associated with a configuration of the particular VM.

8. The method of claim 1 further comprising using the obtained networking state data to configure the at least one of networking forwarding operations and middlebox service operations on the second PNIC.

9. The method of claim 1, wherein the second PNIC includes a virtual switch, the method further comprising adding to the virtual switch a set of identifiers associated with a set of physical ports of the first PNIC that are associated with a particular VNIC (virtual network interface card) of the particular VM, wherein the virtual switch (i) assigns the set of identifiers to a set of interfaces of the virtual switch and (ii) associates the set of interfaces with the particular VNIC of the particular VM.

10. The method of claim 1, wherein the network forwarding operations comprise at least one of layer 2 (L2) forwarding operations and layer 3 (L3) forwarding operations.

11. The method of claim 1, wherein the middlebox service operations comprise at least one of distribute firewall operations, load balancing operations, and network address translation (NAT) operations.

12. The method of claim 1, wherein the first PNIC is a first smartNIC and the second PNIC is a second smartNIC.

13. A non-transitory machine readable medium storing program for execution by a set of one or more processing units, the program for migrating a particular virtual machine (VM) from a first host computer to a second host computer, the first host computer having a first physical network interface card (PNIC) that performs at least one of network forwarding operations and middlebox service operations for the particular VM, the second host computer having a second PNIC for performing at least one of networking forwarding operations and middlebox service operations for the particular VM, the program comprising sets of instructions for:
- at an RDMA (Remote Direct Memory Access) client executing on a set of one or more processors of the second PNIC of the second host computer:
- receiving a notification from the second host computer indicating a data migration that is performed to migrate the particular VM from the first host computer to the second host computer has started;
- based on the notification, directing an RDMA server executing on the first PNIC to provide networking state data associated with at least one of network forwarding operations and middlebox service operations that the first PNIC performs for the particular VM, wherein said provided networking state data resides in a memory of the first PNIC that is accessible to the RDMA server;
- after a migration, deleting the networking state data from the RDMA server;
- configuring the second PNIC by writing the networking state data to a memory of the second PNIC and enabling, based on the networking state data, a forwarding element and a middlebox element of the second PNIC to perform the network forwarding operations and the middlebox service operations for the particular VM;
- the first PNIC is associated with a set of physical ports that connect the first PNIC to a physical network;
- each port in the set of physical ports is associated with (i) a particular identifier and (ii) a particular IP (Internet Protocol) address assigned to the first PNIC;
- before receiving the notification, a compatibility test is performed to ensure the particular identifiers and particular IP addresses assigned to the first PNIC are available at the second host computer; and
- wherein when the particular IP addresses are not available at the second host computer, a third host computer at which the particular IP addresses are available is identified for the data migration to migrate the particular VM from the first host computer to the third host computer.

14. The non-transitory machine readable medium of claim 13, wherein the set of instructions for said directing comprises sets of instructions for:
- establishing communication with the RDMA server on the first PNIC of the first host computer; and
- using the established communication to perform an RDMA operation to obtain the networking state data from the RDMA server on the first PNIC.

15. The non-transitory machine readable medium of claim 14, wherein the set of instructions for establishing communication with the RDMA server comprises a set of instructions for establishing an event channel with the RDMA server.

16. The non-transitory machine readable medium of claim 15, wherein the at least one of network forwarding operations and middlebox service operations are performed by at least one forwarding element of the first PNIC and at least one middlebox element of the first PNIC, wherein the PNIC forwarding element and middlebox element store their state data in the RDMA accessible memory.

17. The non-transitory machine readable medium of claim 15, wherein after the RDMA client on the second PNIC obtains the networking state data from the RDMA server on the first PNIC, the program further comprises a set of instructions for terminating the event channel.

* * * * *